J. W. LARIMORE.
ACETYLENE LAMP.
APPLICATION FILED DEC. 1, 1911.
1,053,186.
Patented Feb. 18, 1913.
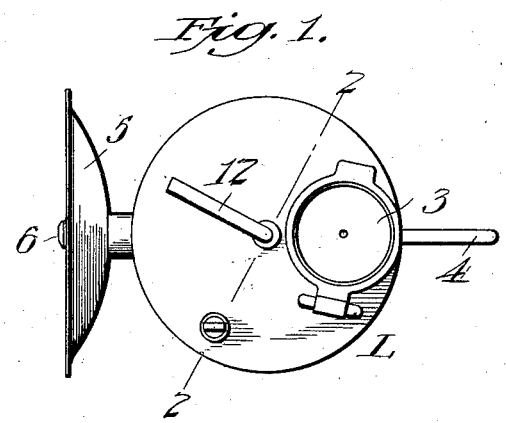
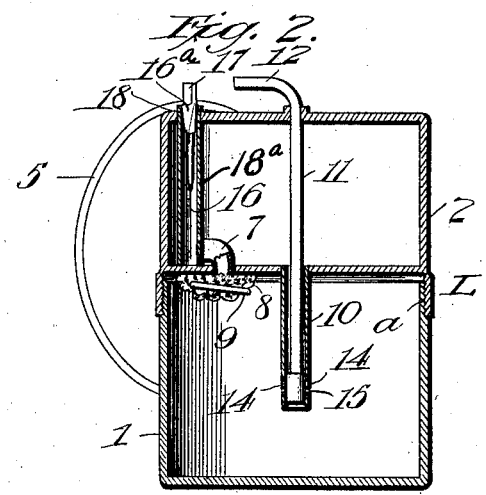
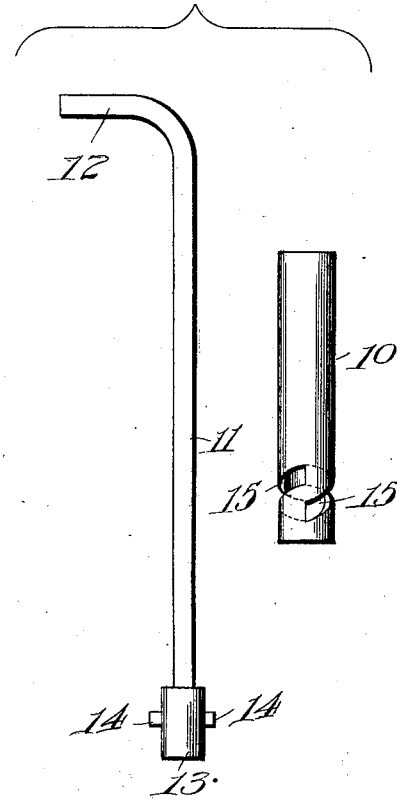
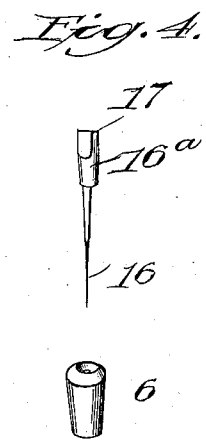
Witnesses
Inventor
John W. Larimore
By
Attorney

UNITED STATES PATENT OFFICE.

JOHN W. LARIMORE, OF SPRINGFIELD, ILLINOIS.

ACETYLENE-LAMP.

1,053,186.  Specification of Letters Patent.  Patented Feb. 18, 1913.

Application filed December 1, 1911.  Serial No. 663,283.

*To all whom it may concern:*

Be it known that I, JOHN W. LARIMORE, a citizen of the United States, residing at Springfield, in the county of Sangamon and State of Illinois, have invented certain new and useful Improvements in Acetylene-Lamps, of which the following is a specification.

This invention relates to a simple and practical construction of portable lamp of the type containing its own gas generating means and possessing special utility as a miner's lamp.

To this end the invention has in view a portable lamp comprising safe and reliable means for the economical generation of acetylene gas, the production of which gas is effectually and reliably controlled by a water supply regulating device, the construction and operation of which will be more readily understood as the description of the case progresses.

With this and other objects in view, which will readily appear to those skilled in the art, the invention consists in the novel construction, combination and arrangement of parts hereinafter more fully described, illustrated and claimed.

A preferred embodiment of the invention is shown in the accompanying drawings, in which—

Figure 1 is a top plan view of the lamp. Fig. 2 is a vertical sectional view taken on the line 2—2 of Fig. 1. Fig. 3 is a detail view of the parts of the water supply regulating device. Fig. 4 is a detail view of the cleaning device illustrating how it may be used with the burner.

Like references designate identical parts throughout the several figures of the drawings.

A preferred form of lamp, the casing of which is designated as L, is shown in the accompanying drawings wherein the numeral 1 refers to the base part or lower section of the lamp casing which forms the carbid receiving and gas generating chamber. The upper outside edge of this section 1 is threaded at *a* so that it may be screwed into the upper casing section 2, which incloses the water compartment. The said casing section 2 includes in its organization a hinged filler cap 3 that covers the filling port, an attaching hook or handle 4, a reflector 5, and a suitable burner 6. The burner 6 is in communication with the upper part of the gas generating chamber by means of the pipe 7, the inlet mouth of which is covered by a filtering medium 8, that is held in place by the spring wire clamp 9. The upper casing section 2 is further equipped with a water-regulating device that is composed of a hollow cylindrical casing 10 that is suspended from the bottom of the section 2 and extends down into the carbid chamber, and a reciprocating operating stem 11 extends through the water compartment and terminates upon the outside of the upper casing section in a suitable handle 12. It will be observed that the stem 11 fits the casing 10 very loosely for the purpose of allowing the ready flow of water into the carbid chamber when necessary. The end of the stem 11 that terminates within the casing 10 has an enlarged cut-off head as at 13 which fits the interior of the casing snugly, and is provided with oppositely extending studs 14. The said studs 14 ride in oppositely located interrupted helical slots 15 in the casing 10. Thus it will be apparent that when the handle 12 is turned so that the studs 14 are at the top of the slots the enlarged portion of the stem will close them so that no water can flow into the lower chamber, and when the studs are in the lower ends of the slots, the upper ends thereof are uncovered so that water may pass from the top compartment 2 onto the carbid in the lower chamber 1.

In order to provide means for cleaning the burner and other parts of the lamp, a fine wire spear 16 having an enlarged conical end 16$^a$ that terminates in a handle 17, is seated in a tapered socket 18 at the top of a housing tube 18$^a$ in the water compartment. It is thus in a position that is readily accessible and always with the device when in use, so that in case the burner becomes clogged at any time it may be cleaned out with the spear intended for that purpose, and no time is lost in finding a fine wire of diameter small enough to enter the gas passage of the burner.

From the foregoing description other objects and advantages will be apparent without further description, and it will also be understood that changes in the form proportion and minor details of construction may be resorted to without departing from the spirit or sacrificing any advantages of the invention.

What I claim is:—

1. In a device of the character described, the combination with a water reservoir, of a valve casing tube in communication with said reservoir and provided with a slotted discharge end, and a reciprocal operating stem having an exterior handle and an enlarged cut-off head, said cut-off head being interlocked with the casing tube and arranged to cover and uncover the slotted discharge end thereof.

2. In a device of the class described, the combination with a water reservoir, of a valve casing tube in communication with said reservoir at one end and at its opposite end provided with interrupted helical slots, and a combined reciprocal and operating stem having a cut-off head working within the tube and provided with studs riding in said slots, said head being arranged to cover and uncover the slots.

In testimony whereof I hereunto affix my signature in the presence of two witnesses.

JOHN W. LARIMORE.

Witnesses:
 ELIZABETH MISTELI,
 MICHAEL ECKSTEIN.

---

Copies of this patent may be obtained for five cents each, by addressing the "Commissioner of Patents, Washington, D. C."